Patented Dec. 7, 1926.

1,609,642

UNITED STATES PATENT OFFICE.

JOSEPH R. COOLIDGE, 3D, OF BROOKLINE, MASSACHUSETTS, ASSIGNOR TO MONTAN, INC., OF BOSTON, MASSACHUSETTS, A CORPORATION OF MASSACHUSETTS.

FIBER BOARD AND THE MANUFACTURE OF SAME.

No Drawing.  Application filed October 31, 1925.  Serial No. 66,100.

This invention relates to fiber board and similar materials, and to methods of manufacturing them. The invention is especially concerned with the products ordinarily referred to as hard fiber, vulcanized fiber, and the like, whether in sheets or molded articles, such materials being hereinafter referred to as "fiber board".

Fiber board is widely used in a great variety of forms for electrical insulation, but its value as an insulating material is adversely affected by its hygroscopic properties. That is, when used for any purpose where it is exposed to the atmosphere, it absorbs moisture readily during periods of high humidity, and subsequently gives up this moisture during a period of low humidity. This characteristic greatly affects its dielectric strength, or in other words, its insulating properties. It is further objectional when the fiber board is used for certain mechanical purposes due largely to the fact that the absorption or loss of moisture causes the fiber board to shrink, swell, or warp. In molded articles, such for example, as pails, the fiber board may even take up so much water that it will split or check.

This objectionable characteristic of fiber board is widely recognized, and many attempts have been made heretofore to overcome it, but so far as I have been able to learn these attempts have not been successful. It is the chief object of the present invention to devise a satisfactory solution for this problem. The invention provides both a superior product and also an improved process of manufacturing or treating fiber board.

I have discovered that it is entirely possible to impregnate fiber board with a high melting point wax known commercially as Montan wax. This is a native mineral wax which is usually imported into this country, but is readily obtainable at moderate expense and in large quantities. The usual source of supply is lignite or pyropissite from which the Montan wax is extracted by means of solvents. The melting point of the wax varies somewhat with different grades, but is usually in the neighborhood of 180° F. and it has the peculiar characteristic of remaining hard and brittle and refusing to soften as its temperature is raised until it almost reaches the melting point. It then passes very suddenly from a solid to a liquid state.

Fiber board which has been thoroughly impregnated with this material, and the microscopic pores and cells thereof completely filled with it, is thereby given properties which contrast strongly with those of the untreated material. It seems to be absolutely impervious to moisture so that it does not shrink, swell or warp appreciably even when exposed for long periods to widely different moisture conditions. Its electrical insulating properties are improved very materially and it becomes very stable as an electric insulator; that is, it does not undergo any great variations in dielectric strength when exposed to wide variations in atmospheric humidity. Due to the fact that it is so highly waterproof, the fiber board treated in this manner can be used successfully out of doors and for purposes where it has not been entirely satisfactory heretofore.

The process used in impregnating fiber board with Montan wax necessarily will vary somewhat with the nature of the material under treatment and the degree of impregnation desired. According to the process which I prefer at present, and assuming that the material under treatment is fiber board sheets about a quarter of an inch in thickness, the fiber board is placed in a cylinder and steamed under a light pressure, say from five to ten pounds, the steaming being continued for several hours until the wood is thoroughly heated up. For the particular product just mentioned eight hours of steaming is ample. This expands the air in the microscopic pores and cells in the fiber board. A vacuum next is created in the cylinder and is maintained until water no longer is given off from the fiber board. It is the usual practice to pump the air extracted from the cylinder through a condenser, and by taking observations from time to time it can readily be determined when water no longer comes over from the cylinder. I prefer to introduce the melted Montan wax into the cylinder while it is still under a vacuum, the wax preferably being heated up to 240° F. While this procedure is not absolutely necessary, it is of advantage in keeping the cells of the fiber board as nearly empty as possible while the heated Montan wax is introduced and submerges the fiber board. The temperature of the wax is maintained at about the point just stated, and the pressure on the liquid wax is gradually raised from about twenty-five (25) pounds to approximately two hundred (200) pounds, the entire pressure period lasting for about five hours, and the maximum pressure being maintained during the last two hours. If apparatus capable of withstanding a higher pressure is available, a pressure in excess of that above mentioned can be used. At the end of the pressure period the pressure is released, the cylinder is opened and the sheets of treated fiber board are withdrawn and allowed to cool. Or the wax may be allowed to cool down nearly to the solidification point before the fiber board is withdrawn. If the fiber board is removed from the cylinder while still at approximately its maximum temperature and allowed to cool in the open air, some of the wax will escape from the pores and cells, so that I prefer to allow the wax to cool off nearly to the solidification point while the fiber board is still immersed.

Very thick sheets of vulcanized fiber may require a longer steaming period and also a longer pressure treatment. In fact, the process may be varied considerably while still retaining its essential characteristics; and it is, of course, advisable to modify the process in accordance with the results desired and the dimensions and nature of the material being treated. The process above described has proved very satisfactory in treating sheets of fiber board about one-quarter of an inch thick and made by the chloride of zinc process, but other kinds of fiber board also have been treated successfully by the same method.

Instead of Montan wax, other waxes having essentially the same characteristics may be used. I have found that carnauba and candelilla waxes may be substituted for Montan. Both of these waxes, however, are much more expensive than Montan wax and while they resemble it closely in many particulars, still I regard Montan wax as superior to either of them. Additional materials may also be mixed with Montan wax in order to produce special effects. For example, oil soluble coloring materials may be mixed with the wax to give the impregnated material the desired color. Other waxes also and oils in small quantities may be associated with the Montan wax. Cylinder oil, for example, may be mixed with the wax. Transil oil which has good insulating properties also may be mixed with the wax. Such mixtures are of advantage in some cases to reduce the viscosity of the wax and facilitate the impregnation in fiber board which is difficult to treat, and they may also be used for the properties which they impart to the finished product. In making such mixtures, however, care should be taken not to lower the melting point of the impregnating material to such a degree that it will soften and ooze from the fiber board at high temperatures to which the fiber board must necessarily be subjected while in use. Atmospheric temperatures may easily run up to 110° or 120° in some localities and a temperature of 140° F. is often attained by articles exposed to the sun, even in the Temperate Zone. Consequently, the impregnated fiber board should be capable at least of withstanding such temperatures without having the waxy impregnating material ooze from the surface thereof, or even soften sufficiently to make the surface of the fiber board greasy or tacky. As above stated, there is an ample margin of safety in Montan wax because of its high melting point, but if it is mixed or blended with other materials, care should be taken to see that the mixture will remain hard and brittle, as distinguished from becoming soft and plastic, when heated to high atmospheric temperatures. The temperature at which the treatment is carried on is limited only by considerations of economy and the point at which the material under treatment will be injured. For vulcanized fiber board it is preferable to keep the temperature below 275° F.

The invention completely overcomes the above described objectionable characteristics of fiber board. At the same time it adds relatively little to the expense of manufacture of this material, while immensely increasing its usefulness.

Having thus described my invention, what I desire to claim as new is:

1. An article of the character described consisting of fiber board impregnated for a substantial depth with a waxy material which is hard and brittle at high atmospheric temperatures but is sufficiently fluid at 275° F. to be forced into said fiber board.

2. An article of the character described consisting of fiber board rendered substantially impervious to moisture by having the pores and cells thereof for a substantial depth filled with a hard waterproof waxy material which will not soften at temperatures below 140° F.

3. An article of the character described consisting of fiber board impregnated for a substantial depth with a composition in which Montan wax predominates.

4. An article of the character described consisting of fiber board impregnated for a substantial depth with Montan wax.

5. An article of the character described consisting of fiber board carrying in the microscopic pores and cells thereof a waterproof waxy material which remains hard at temperatures below 140° F. but becomes sufficiently fluid at 275° F. to be forced into said pores and cells.

6. The process of improving the characteristics of fiber board which consists in impregnating it for a substantial depth with a melted waxy material which is hard and brittle at high atmospheric temperatures but becomes sufficiently fluid at 275° F. to penetrate into the microscopic pores and cells of fiber board, and subsequently allowing the fiber board so treated to cool sufficiently to cause said material to harden therein.

7. The process of improving the characteristics of fiber board which consists in steaming the fiber board, extracting the moisture from the fiber board so steamed, subsequently forcing into the microscopic pores and cells thereof a melted waxy material which is hard and brittle at high atmospheric temperatures, and then allowing the fiber board so treated to cool.

8. The process of impregnating fiber board with a waxy substance which is hard and brittle at high atmospheric temperatures but becomes sufficiently fluid at 275° F. to flow into the microscopic pores and cells of the fiber board, which consists in steaming the fiber board under a light pressure, applying a vacuum to the board so steamed to extract the water therefrom, melting said substance, immersing said fiber board in the liquid so produced, and then increasing the pressure on said liquid sufficiently to force it into the pores and cells of the fiber board.

JOSEPH R. COOLIDGE, III.

at temperatures below 140° F. but becomes sufficiently fluid at 275° F. to be forced into said pores and cells.

6. The process of improving the characteristics of fiber board which consists in impregnating it for a substantial depth with a melted waxy material which is hard and brittle at high atmospheric temperatures but becomes sufficiently fluid at 275° F. to penetrate into the microscopic pores and cells of fiber board, and subsequently allowing the fiber board so treated to cool sufficiently to cause said material to harden therein.

7. The process of improving the characteristics of fiber board which consists in steaming the fiber board, extracting the moisture from the fiber board so steamed, subsequently forcing into the microscopic pores and cells thereof a melted waxy material which is hard and brittle at high atmospheric temperatures, and then allowing the fiber board so treated to cool.

8. The process of impregnating fiber board with a waxy substance which is hard and brittle at high atmospheric temperatures but becomes sufficiently fluid at 275° F. to flow into the microscopic pores and cells of the fiber board, which consists in steaming the fiber board under a light pressure, applying a vacuum to the board so steamed to extract the water therefrom, melting said substance, immersing said fiber board in the liquid so produced, and then increasing the pressure on said liquid sufficiently to force it into the pores and cells of the fiber board.

JOSEPH R. COOLIDGE, III.

DISCLAIMER 1,609,642.—*Joseph R. Coolidge, 3d*, Brookline, Mass. FIBER BOARD AND THE MANUFACTURE OF SAME. Patent dated December 7, 1926. Disclaimer filed July 19, 1930, by the patentee, assignee, *Montan, Inc.*, assenting.

Hereby enters this disclaimer to any interpretation of the term "fiber board" in the claims of said patent except to designate the material known commercially as hard or vulcanized fiber.

[*Official Gazette August 12, 1930.*]

DISCLAIMER

1,609,642.—*Joseph R. Coolidge, 3d*, Brookline, Mass. FIBER BOARD AND THE MANUFACTURE OF SAME. Patent dated December 7, 1926. Disclaimer filed July 19, 1930, by the patentee, assignee, *Montan, Inc.*, assenting.

Hereby enters this disclaimer to any interpretation of the term "fiber board" in the claims of said patent except to designate the material known commercially as hard or vulcanized fiber.

[*Official Gazette August 12, 1930.*]